(12) United States Patent
Luo et al.

(10) Patent No.: US 11,455,071 B2
(45) Date of Patent: Sep. 27, 2022

(54) LAYOUT METHOD, DEVICE AND EQUIPMENT FOR WINDOW CONTROL BARS

(71) Applicant: BEIJING BYTEDANCE NETWORK TECHNOLOGY CO., LTD., Beijing (CN)

(72) Inventors: Yonghao Luo, Beijing (CN); Wei Wei, Beijing (CN); Yangmao Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/979,381

(22) PCT Filed: Mar. 29, 2019

(86) PCT No.: PCT/CN2019/080368
§ 371 (c)(1),
(2) Date: Sep. 9, 2020

(87) PCT Pub. No.: WO2019/185007
PCT Pub. Date: Oct. 3, 2019

(65) Prior Publication Data
US 2022/0004287 A1 Jan. 6, 2022

(30) Foreign Application Priority Data

Mar. 29, 2018 (CN) .......................... 201810273765.0

(51) Int. Cl.
| | |
|---|---|
| *G06F 3/0481* | (2022.01) |
| *G06F 3/0346* | (2013.01) |
| *G06F 3/04847* | (2022.01) |
| *G06F 3/0488* | (2022.01) |
| *G06F 3/14* | (2006.01) |
| *G06F 3/16* | (2006.01) |

(52) U.S. Cl.
CPC .......... *G06F 3/0481* (2013.01); *G06F 3/0346* (2013.01); *G06F 3/0488* (2013.01);
(Continued)

(58) Field of Classification Search
CPC ...... G06F 3/0488; G06F 9/451; G06F 3/0346; G06F 3/0416; G06F 3/0481; G06F 3/04847; G06F 3/14; G06F 3/167
See application file for complete search history.

(56) References Cited

U.S. PATENT DOCUMENTS

| | | | |
|---|---|---|---|
| 2006/0209016 A1* | 9/2006 | Fox ........................ | G06F 3/0481 345/156 |
| 2014/0075377 A1* | 3/2014 | Kang ................ | H04M 1/72409 715/788 |

(Continued)

FOREIGN PATENT DOCUMENTS

| | | |
|---|---|---|
| CN | 103324392 A | 9/2013 |
| CN | 103365598 A | 10/2013 |

(Continued)

OTHER PUBLICATIONS

Jiang He et al., Adaptive User Interface Generation for Web Services, Oct. 1, 2007, IEEE Computer Society, pp. 536-539 (Year: 2007).*

(Continued)

*Primary Examiner* — Tam T Tran
(74) *Attorney, Agent, or Firm* — BakerHostetler

(57) ABSTRACT

A layout method for window control bars applied to an intelligent terminal, the intelligent terminal includes or is connected with a large-screen display, at least one window is displayed on the large-screen display, and the method comprises: receiving detection information from the large-screen display by the intelligent terminal, wherein the detection information comprises screen operation information or
(Continued)

```
                                                    ,-- 201
An intelligent terminal receives detection information from a large-screen
display, wherein the detection information includes screen operation
information or screen placement information.
                              |
                              v                     ,-- 202
The intelligent terminal determines window layout positions corresponding to the
detection information in a preset window layout table, wherein the correspondence
between various kinds of detection information and the window layout positions is
stored in the window layout table.
                              |
                              v                     ,-- 203
The intelligent terminal calls a preset window control bar layout interface to lay
out the window control bars on the windows displayed on the large-screen display
according to the window layout positions
``` screen placement information; determining window layout positions corresponding to the detection information in a preset window layout table by the intelligent terminal; and laying out the window control bars on the windows displayed on the screen display according to the window layout positions. Therefore, the window control bars displayed on the screen are adaptively laid out and adjusted according to various kinds of information of the screen display, and the user experience is improved.

20 Claims, 6 Drawing Sheets

(52) U.S. Cl.
 CPC ............ *G06F 3/04847* (2013.01); *G06F 3/14* (2013.01); *G06F 3/167* (2013.01)

(56) References Cited

U.S. PATENT DOCUMENTS

| | | | |
|---|---|---|---|
| 2014/0101581 A1* | 4/2014 | Lan | ................... G06F 3/04883 715/765 |
| 2014/0168166 A1* | 6/2014 | Chen | ................... G06F 3/0488 345/175 |
| 2014/0380208 A1 | 12/2014 | Kuo | |

FOREIGN PATENT DOCUMENTS

| | | |
|---|---|---|
| CN | 103440087 A | 12/2013 |
| CN | 103677711 A | 3/2014 |
| CN | 105068735 A | 11/2015 |
| CN | 106502530 A | 3/2017 |
| CN | 107454259 A | 12/2017 |

OTHER PUBLICATIONS

Rahul Jain et al., Context based adaptation of application icons in mobile computing devices, Dec. 1, 2013, IEEE Xplore, pp. 31-36 (Year: 2013).*

International Patent Application No. PCT/CN2019/080368; Int'l Search Report; dated Jul. 1, 2019; 3 pages.

Singapore Patent Application No. 11202009614Q; Written Opinion and Search Report; dated Jul. 21, 2022; 6 pages.

* cited by examiner

LAYOUT METHOD, DEVICE AND EQUIPMENT FOR WINDOW CONTROL BARS

CROSS-REFERENCE TO RELATED APPLICATIONS

This disclosure is the U.S. National Stage of International Application No. PCT/CN2019/080368, filed on Mar. 29, 2019, which claims the benefit of priority to Chinese Patent Application with the application number 201810273765.0, filed Mar. 29, 2018. The entire content of this disclosure is hereby incorporated by reference herein.

TECHNICAL FIELD

The present disclosure relates to the Internet field, in particular to a layout method, device and equipment for window control bars.

BACKGROUND

In recent years, the technologies in the field of human-computer interaction have developed rapidly, wherein Human-Computer Interaction Technologies refer to technologies that achieve human-computer interaction through computer input and output equipment in an effective mode. With the explosion of artificial intelligence (AI for short), as the most high-profile future technology at present, AI has been increasingly used in the field of human-computer interaction, and the AI large screen Internet has been regarded as the next focus for the development of the Internet, and can bring more new business opportunities to the Internet industry.

When the screens of the large-screen displays are too large, difficulties in clicking or other operations are caused.

SUMMARY

In order to solve the above problems, the present disclosure provides a layout method, device and equipment for window control bars. The specific technical solutions are as follows:

In a first aspect, the disclosure provides a layout method for window control bars, the method is applied to an intelligent terminal, the intelligent terminal is connected with a large-screen display, at least one window is displayed on the large-screen display, and the method comprises:

receiving detection information from the large-screen display by the intelligent terminal, wherein the detection information comprises screen operation information or screen placement information;

determining window layout positions corresponding to the detection information in a preset window layout table by the intelligent terminal, wherein the window layout table stores the correspondence between various kinds of detection information and window layout positions; and calling a preset window control bar layout interface by the intelligent terminal to lay out the window control bars on the windows displayed on the large-screen display according to the window layout positions.

In a second aspect, the disclosure provides a layout method for window control bars, the method is applied to an intelligent terminal, the intelligent terminal comprises or is connected with a display device, at least one window is displayed on the display device, and the method comprises:

receiving detection information by the intelligent terminal, wherein the detection information comprises screen operation information and/or screen placement information;

determining a window layout mode corresponding to the detection information according to the detection information and the preset correspondence between the detection information and the window layout modes by the intelligent terminal; and laying out the window control bars on the windows displayed on the display device according to the window layout mode corresponding to the detection information by the intelligent terminal.

In a third aspect, the disclosure provides a layout equipment for window control bars, wherein the equipment comprises a memory and a processor, the memory is configured to store program codes and transmit the program codes to the processor; and the processor is configured to execute the layout method for the window control bars according to any one of the fourth aspect according to instructions in the program codes.

According to the layout method for the window control bars provided by the present disclosure, a large-screen display is connected with an intelligent terminal, and at least one window is displayed on the large-screen display. The intelligent terminal receives detection information from the large-screen display, wherein the detection information includes screen operation information or screen placement information; then the intelligent terminal determines the window layout positions corresponding to the detection information in a preset window layout table, wherein the correspondence between various kinds of detection information and the window layout positions is stored in the window layout table; and afterwards the intelligent terminal calls a preset window control bar layout interface to lay out window control bars on the windows displayed on the large-screen display according to the above window layout positions. Therefore, the window control bars displayed on the screen are adaptively laid out and adjusted according to various kinds of information of the large-screen display, and the user experience is improved.

BRIEF DESCRIPTION OF THE DRAWINGS

In order to more clearly explain the technical solutions in the embodiments of the present disclosure, the drawings required in the description of the embodiments are briefly introduced below. Obviously, the drawings in the following description are only some embodiments of the present disclosure, and those of ordinary skill in the art can obtain other drawings based on these drawings without paying creative labor.

DETAILED DESCRIPTION OF THE EMBODIMENTS

Figure 1:
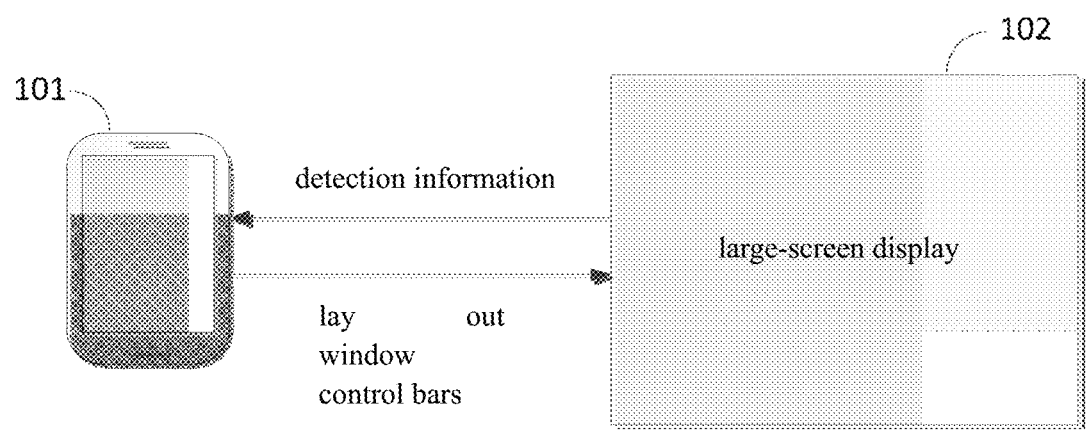
FIG. 1 is a scene example diagram of a layout method for window control bars according to an embodiment of the present disclosure in actual application.

The technical solutions in the embodiments of the present disclosure are described clearly and completely in conjunction with the drawings in the embodiments of the present disclosure below. Obviously, the described embodiments are only a part of the embodiments of the present disclosure, but not all the embodiments. Based on the embodiments in the present disclosure, all other embodiments obtained by those of ordinary skill in the art without creative work fall within the protection scope of the present disclosure.

It is difficult for people to perform click operations on a window displayed on a large-screen display outside the range of physical conditions. That is, the window control bars displayed on the screens cannot be adaptively laid out and adjusted according to various kinds of information on the screens of the large-screen displays in the prior art, which is inconvenient for users to perform various operations on the screens, and user experience is bad.

In an optional implementation, the detection information comprises screen operation information, and the screen operation information comprises touch screen operation information and mouse operation information;

the step of receiving detection information from the large-screen display by the intelligent terminal comprises:

receiving the touch screen operation information sent by the large-screen display when a touch screen operation is detected by the large-screen display by the intelligent terminal; or receiving the mouse operation information sent by the large-screen display when a mouse operation is detected by the large-screen display by the intelligent terminal.

In an optional implementation, the window layout table stores the correspondence between the touch screen operation information and preset positions on the lower portions of windows, and the correspondence between the mouse operation information and preset positions on the upper portions of the windows.

In an optional implementation, the detection information comprises screen placement information; and the screen placement information comprises placement angle information of the large-screen display;

the step of receiving detection information from the large-screen display by the intelligent terminal comprises:

receiving the placement angle information, detected by a gravity sensor of the large-screen display, of the large-screen display by the intelligent terminal.

In an optional implementation, the window layout table stores the correspondence between the horizontal placement of the large-screen display and preset positions on the lower portions of windows, and the correspondence between the vertical placement of the large-screen display and preset positions on the upper portions of the windows.

In an optional implementation, the method further comprises the step:

updating the correspondence between the various kinds of detection information and the window layout positions which is stored in the window layout table.

In an aspect, the disclosure provides a layout device for window control bars, the device is applied to an intelligent terminal, the intelligent terminal is connected with a large-screen display, and at least one window is displayed on the large-screen display, and the device comprises:

a receiving unit configured to receive detection information from the large-screen display, wherein the detection information comprises screen operation information or screen placement information;

a determining unit configured to determine window layout positions corresponding to the detection information in a preset window layout table; and the window layout table stores correspondence between various kinds of detection information and window layout positions; and a layout unit configured to call a preset window control bar layout interface to lay out the window control bars on the windows displayed on the large-screen display according to the window layout positions.

In an optional implementation, the detection information comprises screen operation information, and the screen operation information comprises touch screen operation information and mouse operation information; and the receiving unit comprises:

a first receiving subunit configured to receive the touch screen operation information sent by the large-screen display when a touch screen operation is detected by the large-screen display; or a second receiving subunit configured to receive the mouse operation information sent by the large-screen display when a mouse operation is detected by the large-screen display.

In an optional implementation, the window layout table stores the correspondence between the touch screen operation information and the preset positions on the lower portions of the windows, and the correspondence between the mouse operation information and the preset positions on the upper portions of the windows.

In an optional implementation, the detection information comprises screen placement information; the screen placement information comprises placement angle information of the large-screen display; and the receiving unit comprises:

a third receiving subunit configured to receive the placement angle information of the large-screen display detected by a gravity sensor of the large-screen display.

In an optional implementation, the window layout table stores the correspondence between the horizontal placement of the large-screen display and the preset positions on the lower portions of the windows, and the correspondence between the vertical placement of the large-screen display and the preset positions on the upper portions of the windows.

In an optional implementation, the device further comprises:

an updating unit configured to update the correspondence between the various kinds of detection information and the window layout positions which is stored in the window layout table.

In an aspect, the disclosure provides a layout equipment for window control bars, characterized in that the equipment comprises a memory and a processor, the memory is configured to store program codes and transmit the program codes to the processor; and the processor is configured to execute the layout method for the window control bars according to any one of the first aspect according to instructions in the program codes.

In an optional implementation, the detection information further comprises preset instruction information, and the preset instruction information comprises voice instruction information and/or motion track information and/or click operation information.

In an optional implementation, the motion track information comprises a motion direction, and the preset correspondence between the detection information and the window layout modes comprises: a position change direction, corresponding to the motion direction, of the window control bars relative to window main bodies;

wherein, the motion direction comprises a contact sliding direction or a motion direction of a signal of external input equipment on the display device.

In an optional implementation, the preset correspondence between the detection information and the window layout modes comprises set positions, corresponding to the detection information, of the window control bars relative to the window main bodies, and/or a scaling size, corresponding to the detection information, of the window control bars.

In an optional implementation, the screen operation information comprises touch screen operation information and/or external input equipment operation information.

In an optional implementation, the preset correspondence between the detection information and the window layout modes comprises at least one of the following correspondences:

(1) the touch screen operation information corresponds to the mode that the window control bars are set on the lower portions relative to the window main bodies, and/or corresponds to expansion of the window control bars;

(2) the external input equipment operation information corresponds to the mode that the window control bars are set on the upper portions relative to the window main bodies, and/or corresponds to shrinkage of the window control bars; and (3) the detection information does not comprise the external input equipment operation information corresponds to the mode that the window control bars are set on the lower portions relative to the window main bodies, and/or corresponds to expansion of the window control bars.

In an optional implementation, the screen placement information comprises a placement angle of the display device.

In an optional implementation, the preset correspondence between the detection information and the window layout modes comprise at least one of the following correspondences:

(1) when the placement angle of the display device is smaller than a, the window control bars are set on the lower portions relative to the window main bodies correspondingly, wherein the a ranges from 0 degree to 90 degrees;

(2) when the placement angle of the display device is greater than b, the window control bars are set on the upper portions relative to the window main bodies correspondingly, wherein the b ranges from 0 degree to 90 degrees;

(3) when the placement angle of the display device is smaller than c, the window control bars are expanded correspondingly, wherein the c ranges from 0 degree to 90 degrees; and (4) when the placement angle of the display device is greater than d, the window control bars are shrunk correspondingly, wherein the d ranges from 0 degree to 90 degrees.

In an optional implementation, when the detection information at least comprises touch screen operation information, the window layout mode corresponding to the detection information is the window layout mode corresponding to the touch screen operation information; and when the detection information does not comprise touch screen operation information but comprises screen placement information, the window layout mode corresponding to the detection information is the window layout mode corresponding to the screen placement information.

In an optional implementation, the method further comprises the step:

updating the preset correspondence between the detection information and the window layout modes.

In an aspect, the disclosure provides a layout device for window control bars, the device is applied to an intelligent terminal, the intelligent terminal comprises or is connected with a display device, the display device displays at least one window, and the device comprises:

a receiving unit configured to receive detection information, wherein the detection information comprises screen operation information and/or screen placement information;

a determining unit configured to determine the window layout mode corresponding to the detection information according to the detection information and the preset correspondence between the detection information and the window layout modes; and a layout unit configured to lay out the window control bars on the windows displayed on the display device according to the window layout mode corresponding to the detection information.

In an optional implementation, the detection information further comprises preset instruction information, and the preset instruction information comprises voice instruction information and/or motion track information and/or click operation information.

In an optional implementation, the motion track information comprises a motion direction, and the preset correspondence between the detection information and the window layout modes comprises: a position change direction, corresponding to the motion direction, of the window control bars relative to window main bodies.

wherein, the motion direction comprises a contact sliding direction or a motion direction of a signal of external input equipment on the display device.

In an optional implementation, the preset correspondence between the detection information and the window layout modes comprises set positions, corresponding to the detection information, of the window control bars relative to the window main bodies, and/or a scaling size, corresponding to the detection information, of the window control bars.

In an optional implementation, the screen operation information comprises touch screen operation information and external input equipment operation information; and the receiving unit comprises:

a first receiving subunit configured to receive the touch screen operation information generated by the touch screen operation; or a second receiving subunit configured to receive the external input equipment operation information sent during the external input equipment operation.

In an optional implementation, the preset correspondence between the detection information and the window layout modes comprises at least one of the following correspondences:

(1) the touch screen operation information corresponds to the mode that the window control bars are set on the lower portions relative to the window main bodies, and/or corresponds to expansion of the window control bars;

(2) the external input equipment operation information corresponds to the mode that the window control bars are set on the upper portions relative to the window main bodies, and/or corresponds to shrinkage of the window control bars; and (3) the detection information does not comprise the external input equipment operation information corresponds to the mode that the window control bars are set on the lower portions of the window main bodies, and/or corresponds to expansion of the window control bars.

In an optional implementation, the screen placement information comprises placement angle information of the display device; and the receiving unit comprises:

a third receiving subunit configured to receive the placement angle of the display device.

In an optional implementation, the preset correspondence between the detection information and the window layout modes comprises at least one of the following correspondences:

(1) when the placement angle of the display device is smaller than a, the window control bars are set on the lower portions relative to the window main bodies correspondingly, wherein the a ranges from 0 degree to 90 degrees;

(2) when the placement angle of the display device is greater than b, the window control bars are set on the upper portions relative to the window main bodies correspondingly, wherein the b ranges from 0 degree to 90 degrees;

(3) when the placement angle of the display device is smaller than c, the window control bars are expanded correspondingly, wherein the c ranges from 0 degree to 90 degrees; and (4) when the placement angle of the display device is greater than d, the window control bars are shrunk correspondingly, wherein the d ranges from 0 degree to 90 degrees.

In an optional implementation, when the detection information at least comprises touch screen operation information, the window layout mode corresponding to the detection information is the window layout mode corresponding to the touch screen operation information; and when the detection information does not comprise touch screen operation information but comprises screen placement information, the window layout mode corresponding to the detection information is the window layout mode corresponding to the screen placement information.

In an optional implementation, the device further comprises:

an updating unit configured to update the preset correspondence between the detection information and the window layout modes.

In order to facilitate understanding of the technical solutions provided by the present disclosure, the practical application scenes of the present disclosure are introduced at first. FIG. 1 is a scene example diagram of the present disclosure in actual application. As shown in FIG. 1, the layout method for the window control bars according to the present disclosure can be applied to application scenes includes an intelligent terminal 101 and a large-screen display 102; wherein the intelligent terminal 101 refers to any user equipment which can establish connection with the large-screen display 102 and achieve human-computer interaction with a user, and then control the large-screen display 102 according to detection information of the large-screen display 102, such as a smartphone or a tablet computer and a laptop personal computer; the large-screen display 102 refers to large-screen display equipment capable of communicating with the intelligent terminal 101 and displaying at least one window for the intelligent terminal 101, such as a large screen in a direct-view color TV or a rear projection TV with the diagonal of the screen being 40 inches or longer, or the large-screen display 102 may also be a display of the intelligent terminal 101, and the large-screen display 102 can communicate with an information processing system of the intelligent terminal 101.

FIG. 1 shows a schematic diagram of an exemplary application scene of an embodiment of the present disclosure. In practical applications, the intelligent terminal 101 is connected to the large-screen display 102 firstly so that at least one window of the intelligent terminal can be displayed on the large-screen display 102, for example, a word document window and a shopping website window can be displayed. When the large-screen display 102 detects user screen operation information or screen placement information of a user, for example, the large-screen display 102 sends detection information to the intelligent terminal 101 when detecting that a user operates the screen by touching or tilts the large-screen display at a certain angle, and the intelligent terminal 101 will query the window layout positions corresponding to the detection information according to a preset window layout table after receiving the detection information sent by the large-screen display 102 and then lay out window control bars on windows displayed on the large-screen display according to the corresponding window layout positions, so that the window control bars displayed on the screen are adaptively laid out and adjusted according to various kinds of information of the large-screen display, and the user experience is improved. Based on the above application scene, an embodiment of the present disclosure provides a layout method for window control bars which will be described in detail below with reference to the drawings.

Figure 2:
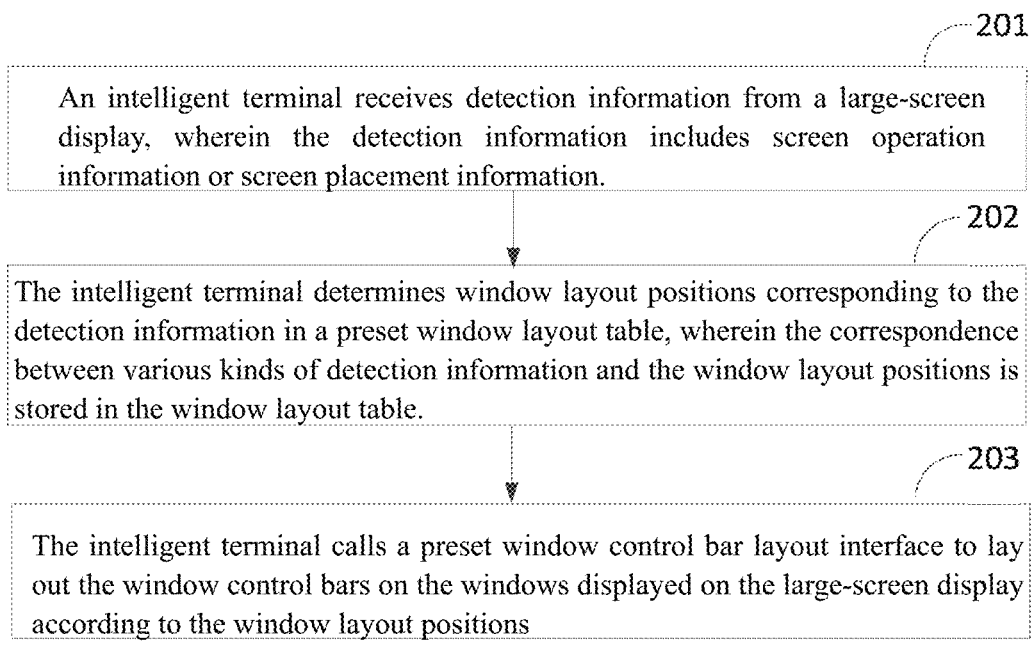
FIG. 2 is a flowchart of a layout method for window control bars according to an embodiment of the present disclosure.

FIG. 2 shows a flowchart of a layout method for window control bars according to an embodiment of the present disclosure, the connection mode between an intelligent terminal and a large-screen display is mainly detailed below, but it should be explained that any explanation about the large-screen display is applicable to displays when the intelligent terminal is provided with a display.

As shown in FIG. 2, the method includes:

Step 201: An intelligent terminal receives detection information from a large-screen display, wherein the detection information includes screen operation information or screen placement information.

In practical application, the intelligent terminal can be connected with the large-screen display, thus, all application windows opened on the intelligent terminal can be displayed on the large-screen display, that is, at least one window of the intelligent terminal is displayed on the large-screen display, and then a user can perform various operations on the windows opened by the intelligent terminal displayed on the large-screen display. For example, the user can click on the windows by screen touching or through a mouse, or the user can place the large-screen display horizontally or vertically. When the large-screen display detects the operation on the display performed by the user, detection information is sent to the intelligent terminal connected with the display, wherein the detection information includes user operation information on a screen of the large-screen display or screen placement information.

In step 201, a possible implementation mode is that the detection information includes screen operation information, and the screen operation information includes touch screen operation information and mouse operation information;

Then the intelligent terminal receives the detection information from the large-screen display, which includes:

The intelligent terminal receives touch screen operation information sent by the large-screen display when the large-screen display detects the touch screen operation; or the intelligent terminal receives mouse operation information sent by the large-screen display when the large-screen display detects the mouse operation.

Figure 3:
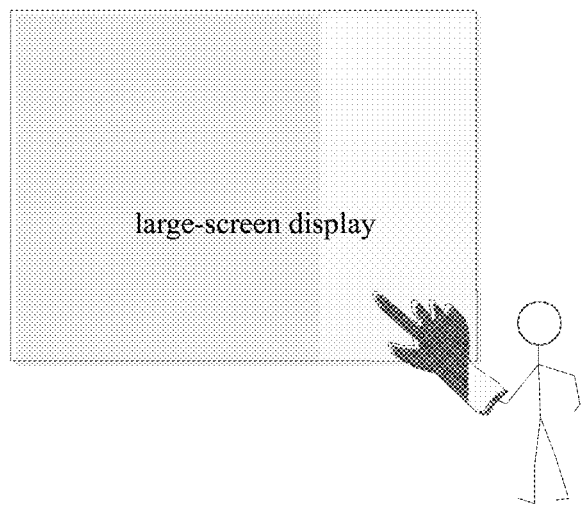
FIG. 3 is a schematic diagram of a user operating a screen in a touch mode according to an embodiment of the present disclosure.

In practical application, the large-screen display can display various windows opened by the intelligent terminal by being connected with the intelligent terminal, and a user can perform various operations on the windows displayed on the large-screen display, such as the touch screen operation, as shown in FIG. 3, which shows a schematic diagram of the user operating a screen in a touch mode according to an embodiment of the present disclosure, wherein the user clicks on the screen of the large-screen display to perform the touch screen operation by touching.

Figure 4:
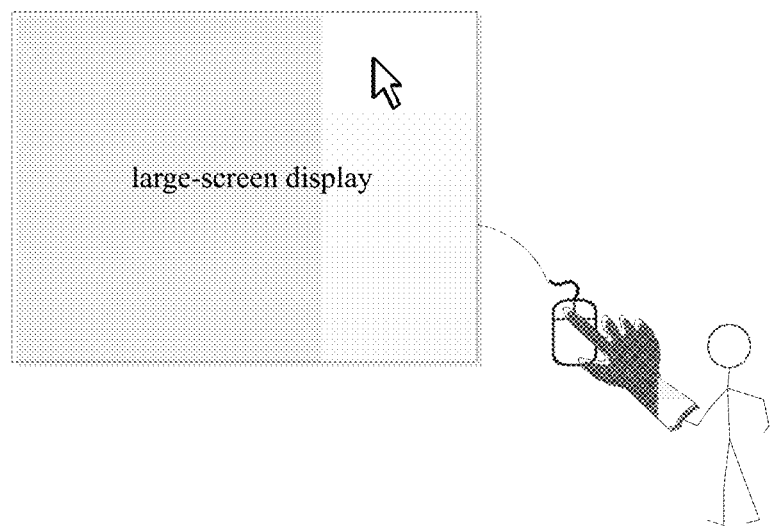
FIG. 4 is a schematic diagram of a user operating a screen in a mouse mode according to an embodiment of the present disclosure.

In addition, the user can also operate the screen of the large-screen display in other ways, for example, the user clicks on the screen through a mouse, as shown in FIG. 4, which shows a schematic diagram of a user operating a screen in a mouse mode according to an embodiment of the present disclosure, wherein the mouse is connected to the large-screen display in advance so that the user can perform mouse operation on the screen of the large-screen display by manipulating the mouse. The mouse can also be replaced with other external input equipment herein, such as a touchpad, a keyboard or other smart equipment, and the mouse can also be connected to the intelligent terminal without being connected to the display certainly.

Further, when the large-screen display detects various operations performed by the user on the display, the large-screen display sends detection information to the intelligent terminal, so that the intelligent terminal performs subsequent operations after receiving the detection information, wherein the detection information includes screen operation information, and the screen operation information includes touch screen operation information and mouse operation information. The touch screen operation information refers to the information that the user operates the screen by touching, and the mouse operation information refers to the information that the user operates the screen by manipulating the mouse.

Corresponding to the above two different kinds of screen operation information, the detection information received by the intelligent terminal is also different, for example, corresponding to the touch screen operation information in FIG. 3 in which the user operates the screen by touching, the detection information received by the intelligent terminal is the touch screen operation information sent by the large-screen display when the large-screen display detects the touch screen operation by the user; and corresponding to the mouse operation information in FIG. 4 in which the user operates the screen by manipulating the mouse, the detection information received by the intelligent terminal is the mouse operation information sent by the large-screen display when the large-screen display detects that the user operates the screen by manipulating the mouse.

In step 201, a possible implementation mode is that the detection information includes preset instruction information, and the preset instruction information includes voice instruction information and/or motion track information and/or click operation information.

The voice instruction information can be received by the large-screen display and then transmitted to the intelligent terminal, or can be directly received by the intelligent terminal herein. The voice instruction information can be preset and stored by an intelligent terminal system in a preset window layout table to establish the correspondence with the window control bar layout modes, and can be preset by the user according to operation habits. The voice instruction information can also be updated by the user or the intelligent terminal system according to the usage situation certainly.

The motion track information refers to a user finger motion track on the large-screen display or sensed user position motion information herein. The finger motion track refers to information of single-contact or multiple-contact slide in a preset direction, that is, single-finger slide or multi-finger slide or mouse slide. The motion track information includes a motion direction, and the correspondence with the window layout modes includes a position change direction, corresponding to the motion direction, of window control bars relative to window main bodies. The motion direction includes a contact sliding direction, or a motion direction of a signal of external input equipment on a display device. For example, when the motion direction is rightward sliding, the window control bars are arranged on the right sides relative to the window main bodies, and when the motion direction is leftward sliding, the window control bars are arranged on the left sides relative to the window main bodies.

The click operation information refers to the click operation performed by the user on the large-screen display according to preset information, for example, the duration of a click contact and/or the interval between two contacts of which the occurrence times are adjacent meet the preset conditions, namely the operation information of long-press or successive and repetitive touch or click on the screen. For example, long press corresponds to expansion of the window control bars. In step 201, another possible implementation mode is that the detection information includes screen placement information, and the screen placement information includes placement angle information of the large-screen display;

The intelligent terminal receives the detection information from the large-screen display, which includes:

The intelligent terminal receives the placement angle information of the large-screen display detected by a gravity sensor of the large-screen display.

The placement angle information herein refers to the acute angle between the plane where the large-screen display is located and the horizontal plane.

Figure 5:
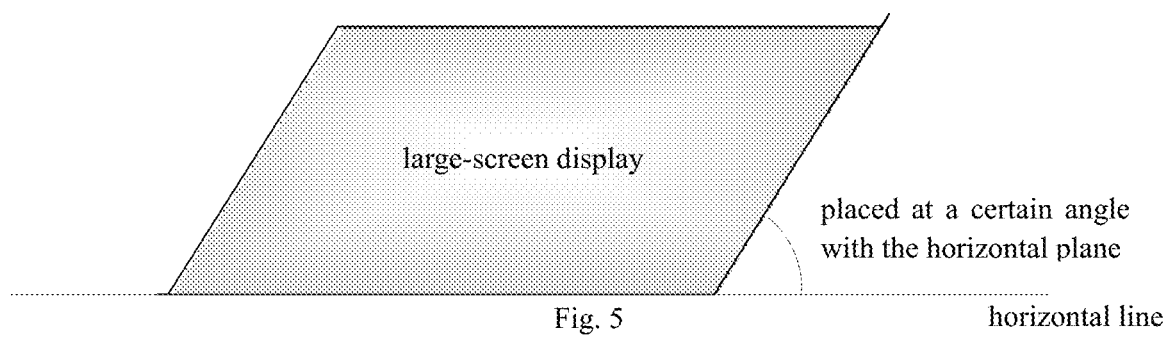
FIG. 5 is a schematic diagram of a large-screen display placed at an angle according to an embodiment of the present disclosure.

In practical application, the large-screen display can display various windows opened by the intelligent terminal by being connected with the intelligent terminal. The screen of the large-screen display is placed in different positions according to user needs. Meanwhile, the large-screen display can detect the screen placement information of the large-screen display by the user through the gravity sensor of the large-screen display, FIG. 5 shows a schematic diagram of a large-screen display placed at an angle according to an embodiment of the present disclosure, wherein the large-screen display is placed at a certain angle with the horizontal plane, and the tilt angle can be changed. Since the user need is different, the angle between the placement position of the large-screen display and the horizontal plane is also different.

Furthermore, the large-screen display can detect the placement angle information of the large-screen display by the user through the gravity sensor of the large-screen display, and send the detected screen placement information to the intelligent terminal, so that the intelligent terminal can perform subsequent operations after receiving the detection information. The gravity sensor refers to a novel sensor technology, in the gravity sensor, a cantilever displacement device made of an elastic sensitive element and an energy storage spring made of an elastic sensitive element drive an electrical contact, so that conversion from gravity change to an electrical signal is completed, and the large-screen display measures the acceleration due to gravity through the gravity sensor and can calculate the tilt angle of the large-screen display relative to the horizontal plane. The detection information includes screen placement information, and the screen placement information includes placement angle information of the large-screen display. The placement angle information is the information that the user places the large-screen display at a certain angle from the horizontal plane.

After receiving the detection information from the large-screen display, the mobile terminal continues to perform step 202.

Step 202: The intelligent terminal determines window layout positions corresponding to the detection information in a preset window layout table, wherein the correspondence between various kinds of detection information and the window layout positions is stored in the window layout table.

In the embodiment of the present disclosure, the intelligent terminal sets the window layout table in a database in advance, and the window layout table stores the correspondence between various kinds of detection information and the window layout positions. When the intelligent terminal receives the detection information, the intelligent terminal can query the window layout positions corresponding to the detection information from the preset window layout table, and then continue to perform step 203. The window layout table may also store correspondence between various kinds of detection information and the layout sizes of the window control bars.

For example: assume that the intelligent terminal is a smart phone A which sets a window layout table in a system database in advance, the table stores the correspondence between the detection information and the window layout positions, for instance, if the detection information is that touch screen operation is performed, the window control bars are correspondingly arranged on the lower portions of the windows; and if the detection information is that the screen is placed horizontally on the horizontal plane, the window control bars are also arranged on the lower portions of the windows correspondingly. Furthermore, the smart phone A can query the window layout positions corresponding to the detection information from the window layout table according to the detection information sent by the large-screen display connected with the smart phone A, and continue to perform subsequent steps.

In step 202, a possible implementation mode is that the window layout table stores the correspondence between the touch screen operation information and preset positions on the lower portions of the windows, and the correspondence between the mouse operation information and preset positions on the upper portions of the windows.

In practical application, the window layout table preset in the intelligent terminal stores the correspondence between the touch screen operation information and the preset positions on the lower portions of the windows and the correspondence between the mouse operation information and the preset positions on the upper portions of the window. That is, when the intelligent terminal receives the detection information sent by the large-screen display, if the detection information is the touch screen operation information, the intelligent terminal may determine that the layout positions of the window control bars, corresponding to the detection information, namely, the touch screen operation information, are the preset positions on the lower portions of the windows according to the correspondence between the touch screen operation information and the preset positions on the lower portions of the windows in the window layout table, thus the user can perform operation on the windows, such as closing the windows, by clicking on the window control bars on the lower portions of the windows when operating the large screen by touching, the situation that in a traditional display mode, the window control bars are arranged on the upper portions of the windows, since the screen is too large, the user has the difficulty in touching the window control bars on the upper portions of windows displayed on the large-screen display due to the insufficient height of the user is avoided, and the user experience is improved; and similarly, if the detection information is the mouse operation information, the intelligent terminal can determine that the layout positions of the window control bars corresponding to the detection information, namely, the touch screen operation information, are the preset positions on the upper portions of the windows according to the correspondence between the mouse operation information and the preset positions on the upper portions of the windows in the window layout table, which conforms to the traditional way of using mice to operate windows, and also the user experience is improved.

In practical application, the window layout table preset in the intelligent terminal may also store the correspondence between touch screen operation information and window control bar expansion, and the correspondence between external input equipment operation information and window control bar shrinkage. The scaling of the window control bars may include a method of scaling the window control bars as a whole, or a method of scaling only buttons on the window control bars. The method of scaling the window control bars as a whole may be two-dimensional scaling, that is, the windows are scaled in the up and down direction and/or left and right direction simultaneously, for example, when the window control bars are located in the middles of the window main bodies, the vertical heights and the left-right lengths of the window control bars can be scaled simultaneously, for another example, when the window control bars are located in corners of the window main bodies and the two sides of the window control bars coincide with the two sides of the window main bodies, the vertical heights and the left-right lengths of the two non-coincident sides of the window control bars can be scaled simultaneously; and the method of scaling the window control bars as a whole may also be one-dimensional scaling, for example, the sides, coinciding with the window main bodies, of the window control bars remain unchanged, and only the sides perpendicular to the window main bodies are scaled, for instance, when the window control bars are located on the lower portions of the window main bodies, only the heights of the window control bars is scaled, and the window control bars remain unchanged in the length direction.

The layout sizes of the scaled window control bars and the window preset positions may be associated. For example, when the detection information sent by the large-screen display and received by the intelligent terminal is touch screen operation information, the corresponding layout positions of the window control bars are the preset positions on the lower portions of the windows, and the window control bars are expanded simultaneously; when the intelligent terminal receives the detection information sent by the large-screen display and received by the intelligent terminal is the operation information of preset external input equipment such as a mouse, the corresponding layout positions of the window control bars are the preset positions on the upper portions of the windows, and the window control bars are shrunk simultaneously. Of course, the layout sizes of the scaled window control bars and the window preset positions may not be associated. For example, when the detection information sent by the large-screen display and received by the intelligent terminal is the touch screen operation information, the layout positions of the window control bars are the preset positions on the lower portions of the windows correspondingly or only the window control bars are expanded; and when the detection information sent by the large-screen display and received by the intelligent terminal is the operation information of preset external input equipment such as a mouse, the layout positions of the window control bars are the preset positions on the upper portions of the windows correspondingly or only the window control bars are shrunk.

When the detection information sent by the large-screen display and received by the intelligent terminal does not include the operation information of preset external input equipment such as a mouse herein, the intelligent terminal takes the current operation as the touch screen operation by default preferentially, and the intelligent terminal selects the correspondence between the touch screen operation information and the window layout in the window layout table to lay out the windows.

In practical application, the intelligent terminal may also store preset instruction information including voice instruction information and/or motion track information and/or click operation information so as to establish the correspondence with the window control bar layout in the window layout table. For example, the window control bars are arranged on the sides, close to the occurrence position according to the occurrence position of the motion track or the click operation information on the screen, of the window main bodies. For example, when the window control bars are located on the left sides of the main bodies, if a preset slide gesture instruction or contact click instruction is received in the screen areas on the right sides of the window main bodies, the window layout bars can be adjusted to the right sides of the window main bodies. For instance, in actual application, if the current large-screen display is an ultra-large electronic whiteboard, when a presenter walks from the left side to the right side of the ultra-large electronic whiteboard, the window control bars which are originally located on the left sides of the window main bodies can be switched to the right sides of the window main bodies through a preset gesture motion track, such as rightward sliding. If a voice instruction is received, the position information or scaling instruction information in the voice instruction may be analyzed, and the positions and/or sizes of the window control bars may be adjusted according to the position information and/or scaling instruction information.

The correspondence between the motion track information and/or the click operation information and the window control bar layout may be preset by a user according to the operation habits, or may be updated by the user or the intelligent terminal system according to the usage condition.

In step 202, another possible implementation mode is that the window layout table stores the correspondence between the horizontal placement of the large-screen display and the preset positions on the lower portions of the windows, and the correspondence between the vertical placement of the large-screen display and the preset positions on the upper portions of the windows.

In practical application, the window layout table preset by the intelligent terminal stores the correspondence between the placement angle information of the large-screen display and the window preset positions, and the placement angle information of the large-screen display is specifically the information of angle ranges formed by the large-screen display and the horizontal plane. A preferred method is that the window layout table stores the correspondence between the horizontal placement of the large-screen display and the preset positions on the lower portions of the windows, and the correspondence between the vertical placement of the large-screen display and the preset positions on the upper portions of the windows. That is, when the intelligent terminal receives the screen placement information which is detected by the gravity sensor and sent by the large-screen display, if the screen placement information is that the large-screen display is placed horizontally, the intelligent terminal can determine that the layout positions of the window control bars, corresponding to the screen placement information, that is, the large-screen display is placed horizontally, are the preset positions on the lower portions of the windows according to the correspondence between the horizontal placement of the large-screen display and the preset positions on the lower portions of the windows in the window layout table; and similarly, if the screen placement information is that the large-screen display is placed vertically, the intelligent terminal can determine that the layout positions of the window control bars, corresponding to the screen placement information, that is, the large-screen display is placed vertically, are the preset positions on the upper portions of the windows according to the correspondence between the vertically placement of the large-screen display and the preset positions on the upper portions of the windows in the window layout table.

The window layout table preset by the intelligent terminal also stores the correspondence between the placement angle information of the large-screen display and scaling of the window control bars. The placement angle information of the large-screen display is specifically the information of acute angle ranges formed by the plane where the large-screen display is located and the horizontal plane, and the specific correspondence includes:
- (1) When the placement angle of the large-screen display is smaller than a, the window control bars are set on the lower portions relative to the window main bodies correspondingly, wherein a ranges from 0 degree to 90 degrees;
- (2) When the placement angle of the large-screen display is greater than b, the window control bars are set on the upper portions relative to the window main bodies correspondingly, wherein the b ranges from 0 degree to 90 degrees;
- (3) When the placement angle of the large-screen display is smaller than c, the window control bars are expanded correspondingly, wherein the c ranges from 0 degree to 90 degrees;
- (4) When the placement angle of the large-screen display is greater than d, the window control bars are shrunk correspondingly, wherein the d ranges from 0 degree to 90 degrees; and The four angle values of a, b, c and d may be the same or different herein.

After determining the window layout positions corresponding to the detection information, the intelligent terminal continues to perform step 203.

Step 203: The intelligent terminal calls a preset window control bar layout interface to lay out the window control bars on the windows displayed on the large-screen display according to the window layout positions.

In practical application, when the intelligent terminal determines the window layout positions corresponding to the detection information in the preset window layout table according to the detection information from the large-screen display, the intelligent terminal calls the preset window control bar layout interface to lay out the window control bars on the windows displayed on the large-screen display according to the determined window layout positions, wherein the window control bar layout interface refers to a layout tool which controls the display positions of the window control bars on the windows.

When the touch screen operation information, the operation information of external input equipment such as a mouse, and the screen placement information all exist, the window layout mode corresponding to the touch screen operation information is preferentially adopted, that is, when the detection information includes at least the touch screen operation information, the window layout mode corresponding to the detection information is the window layout mode corresponding to the touch screen operation information; and when the detection information does not include the touch screen operation information but includes the screen placement information, the window layout mode corresponding to the detection information is the window layout mode corresponding to the screen placement information.

Figure 6:
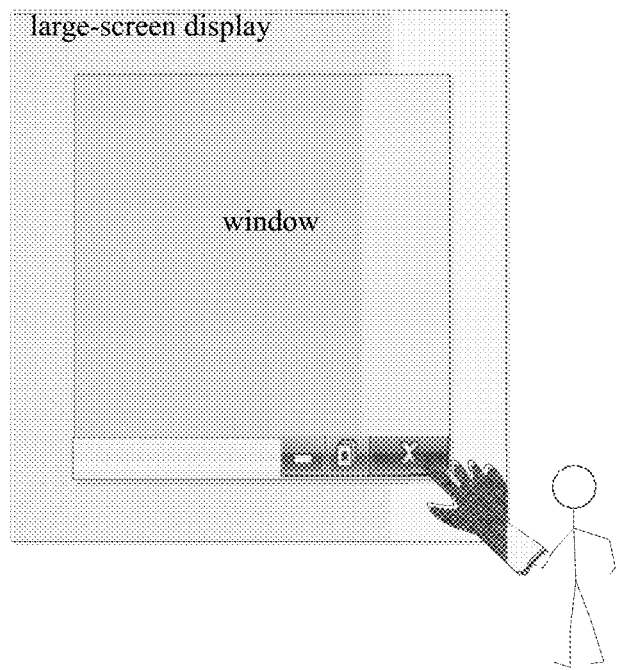
FIG. 6 is a schematic diagram of layout of a window control bar according to an embodiment of the present disclosure.

For example: assume that the detection information received by the intelligent terminal for the large-screen display is the touch screen operation information, as shown in FIG. 3. The preset window layout table stores the correspondence between the touch screen operation information and the preset positions on the lower portions of the windows, then the intelligent terminal determines that the detection information is the touch screen operation information, and correspondingly, the window layout positions are the preset positions on the lower portions of the windows. Furthermore, the window control bars on the windows displayed on the large-screen display can be laid out according to the window layout positions, as shown in FIG. 6, the intelligent terminal calls the preset window control bar layout interface for the detection information of the touch screen operation information to lay out the window control bars on the windows displayed on the large-screen display according to the determined window layout positions, and adaptively lays out the window control bars containing buttons such as "minimization" and "closing" on the lower portions of the windows.

Figure 7:
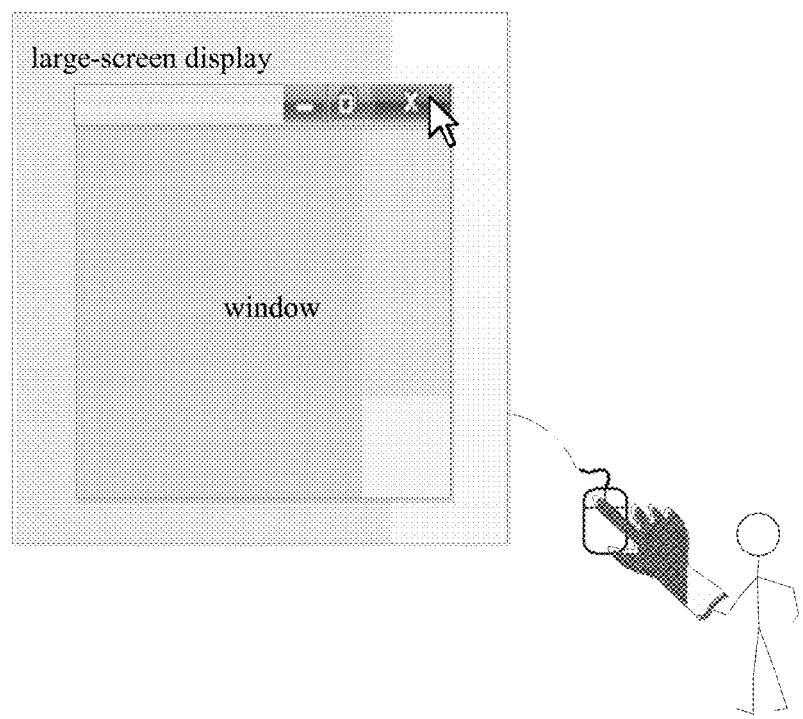
FIG. 7 is a schematic diagram of layout of a window control bar according to an embodiment of the present disclosure.

Alternatively, assume that the detection information received by the intelligent terminal for the large-screen display is mouse operation information, as shown in FIG. 4. The preset window layout table stores the correspondence between the mouse operation information and the preset positions on the upper portions of the windows, then the intelligent terminal determines that the detection information is the mouse operation information, and the corresponding window layout positions are the preset positions on the upper portions of the windows. Furthermore, the window control bars on the windows displayed on the large-screen display can be laid out according to the window layout positions, as shown in FIG. 7, the intelligent terminal calls the preset window control bar layout interface for the detection information of the mouse operation information to lay out the window control bars on the windows displayed on the large-screen display according to the determined window layout positions, and adaptively lays out the window control bars containing buttons such as "minimization" and "closing" on the upper portions of the windows.

Figure 8:
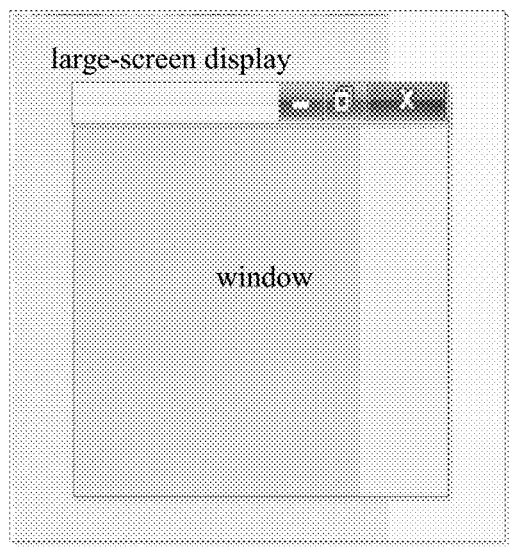
FIG. 8 is a schematic diagram of layout of a window control bar according to an embodiment of the present disclosure.

For another example: assume that the detection information received by the intelligent terminal for the large-screen display is the screen placement information, as shown in FIG. 5. The preset window layout table stores the correspondence between the screen placement information and the window preset positions, then the intelligent terminal determines that the detection information is the screen placement information, the corresponding window layout positions are the window preset positions. Furthermore, the window control bars on the windows displayed on the large-screen display can be laid out according to the window layout positions, as shown in FIG. 8, the intelligent terminal determines that the window layout positions corresponding to the vertical placement of the large-screen display are the preset positions on the upper portions of the windows for the detection information of vertical placement of the large-screen display in the preset window layout table, then calls the preset window control bar layout interface to lay out the window control bars on the windows displayed on the large-screen display according to the determined window layout positions, and adaptively lays out the window control bars containing buttons such as "minimization" and "closing" on the upper portions of the windows.

Figure 9:
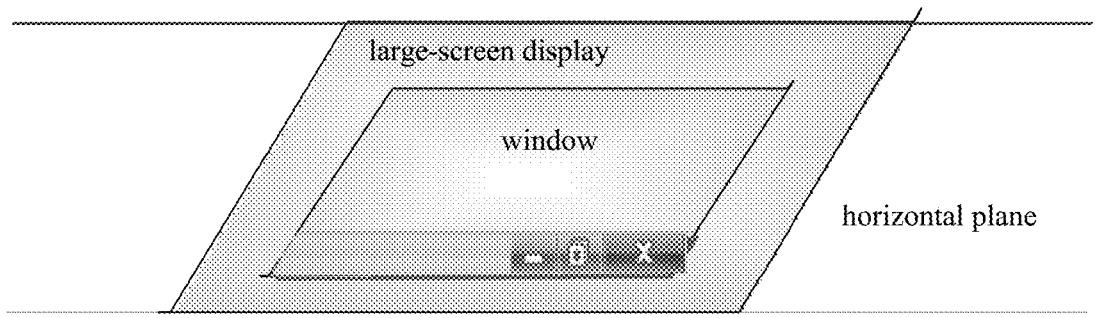
FIG. 9 is a schematic diagram of layout of a window control bar according to an embodiment of the present disclosure.

Alternatively, as shown in FIG. 9, in response to the detection information that the large-screen display is placed horizontally, the intelligent terminal determines that the window layout positions corresponding to the vertical placement of the large-screen display are the preset positions on the lower portions of the windows in the preset window layout table, then calls the preset window control bar layout interface to lay out the window control bars on the windows displayed on the large-screen display according to the determined window layout positions, and adaptively lays out the window control bars containing buttons such as "minimization" and "closing" on the lower portions of the windows.

In some possible implementation modes of the present disclosure, the present disclosure further includes: the correspondence between various kinds of detection information stored in the window layout table and the window layout positions is updated.

In practical application, various kinds of detection information and the window layout positions stored in the window layout table can be updated in real time according to user needs.

Figure 10:
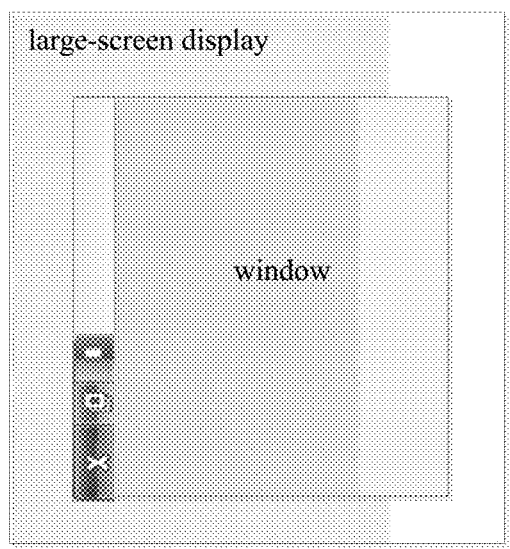
FIG. 10 is a schematic diagram of layout of a window control bar according to an embodiment of the present disclosure.

For example: assume that according to the correspondence, originally stored in the window layout table, between the vertical placement of the large-screen display and the preset positions on the upper portions of the windows, the window control bars are laid out as shown in FIG. 8. However, if a user wants to lay out the window control bars of the displayed windows on the left sides when placing the large-screen display vertically, that is, if the user wants to correspond the horizontal placement of the large-screen display to the preset positions on the left sides of the windows, the intelligent terminal can update the window layout table according to the user needs, and establishes the correspondence between the vertical placement of the large-screen display and the preset positions on the left sides of the windows, so that when the intelligent terminal subsequently receives the screen placement information detected by the gravity sensor of the large-screen display as the vertical placement of the large-screen display, the intelligent terminal can determine the window layout positions according to the correspondence between the vertical placement of the large-screen display and the preset positions on the left sides of the windows in the updated window layout table, then lays out the window control bars on the windows displayed on the large-screen display and adaptively lays out the window control bars containing buttons such as "minimization" and "closing" on the left sides of the windows, as shown in FIG. 10.

The correspondence between the various kinds of detection information and the window layout sizes which is stored in the window layout table can also be changed or updated.

The correspondence between the various kinds of detection information and the window layout which is stored in the window layout table may be updated by the user according to user needs, or may be automatically updated by a server by analyzing user operation habits.

In this way, according to the layout method for the window control bars provided by the present disclosure, the large-screen display is connected to the intelligent terminal, and at least one window is displayed on the large-screen display. The intelligent terminal firstly receives the detection information from the large-screen display, wherein the detection information includes screen operation information or screen placement information; then, the intelligent terminal determines the window layout positions corresponding to the detection information in the preset window layout table, wherein the correspondence between various kinds of detection information and the window layout positions is stored in the window layout table; and afterwards, the intelligent terminal calls the preset window control bar layout interface to lay out the window control bars on the windows displayed on the large-screen display according to the above window layout positions. Therefore, the window control bars displayed on the screen are adaptively laid out and adjusted according to various kinds of information of the large-screen display, and the user experience is improved.

Figure 11:
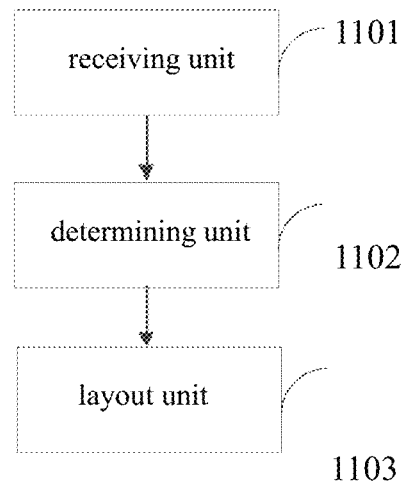
FIG. 11 is a schematic structural diagram of a layout device for window control bars according to an embodiment of the present disclosure.

Based on the above layout method for the window control bars, the present disclosure also provides a layout device for window control bars, the device is applied to an intelligent terminal, the intelligent terminal is connected to a large-screen display, and the large-screen display displays at least one window. As shown in FIG. 11, the device includes:

A receiving unit 1101 configured to receive detection information from the large-screen display, wherein the detection information includes screen operation information or screen placement information;

A determining unit 1102 configured to determine window layout positions corresponding to the detection information in a preset window layout table; the window layout table stores correspondence between various kinds of detection information and window layout positions; and the window layout table also stores the correspondence between various kinds of detection information and the window layout sizes.

A layout unit 1103 configured to call a preset window control bar layout interface to lay out the window control bars on the windows displayed on the large-screen display according to the window layout positions.

The detection information includes preset instruction information herein, and the preset instruction information includes voice instruction information and/or motion track information and/or click operation information. The preset instruction information can be pre-stored by the intelligent terminal system so as to establish correspondence with the layout of the window control bars in the preset window layout table, and the motion track information refers to the contact motion track of a user on the large-screen display, or the motion track of a signal of external equipment on the large-screen display, or the sensed user position motion information. The motion track information includes motion direction information, and the correspondence with the window layout modes includes a position change direction, corresponding to the motion direction, of the window control bars relative to window main bodies. The motion direction includes the contact sliding direction, or the motion direction of a signal of external input equipment on a display device. For example, when the motion direction is rightward sliding, the window control bars are arranged on the right sides relative to the window main bodies, and when the motion direction is leftward sliding, the window control bars are arranged on the left sides relative to the window main bodies. The click operation information refers to the click operation performed by the user on the large-screen display according to preset information, for example, the duration of a click contact and/or the interval between two contacts of which the occurrence times are adjacent meet the preset conditions, namely the operation information of long-press or successive and repetitive touch or click on the screen. For example, long press corresponds to expansion of the window control bars.

Optionally, the detection information includes screen operation information, and the screen operation information includes touch screen operation information and mouse operation information;

The receiving unit 1101 specifically includes:

A first receiving subunit configured to receive the touch screen operation information sent by the large-screen display when a touch screen operation is detected; or A second receiving subunit configured to receive the mouse operation information sent by the large-screen display when a mouse operation is detected.

Optionally, the window layout table stores the correspondence between the touch screen operation information and the preset positions on the lower portions of the windows, and the correspondence between the mouse operation information and the preset positions on the upper portions of the windows. The window layout table also stores the correspondence between the touch screen operation information and expansion of the window control bars, the correspondence between the operation information of the mouse and other external input equipment and shrinkage of the window control bars, and the correspondence between detection signals which do not include the mouse operation information and the window control bars arranged on the lower portions relative to the window main bodies and/or expansion of the window control bars.

Optionally, the detection information includes screen placement information; and the screen placement information includes placement angle information of the large-screen display; and The receiving unit 1101 specifically includes:

A third receiving subunit configured to receive the placement angle information of the large-screen display detected by a gravity sensor of the large-screen display.

Optionally, the window layout table stores the correspondence between the horizontal placement of the large-screen display and the preset positions on the lower portions of the windows, and the correspondence between the vertical placement of the large-screen display and the preset positions on the upper portions of the windows. The window layout table also stores the correspondence between the placement angle information of the large-screen display and scaling of the window control bars. The placement angle information of the large-screen display is specifically the information of acute angle ranges formed by the plane where the large-screen display is located and the horizontal plane, and the specific correspondence includes:
  (1) When the placement angle of the large-screen display is smaller than a, the window control bars are set on the lower portions relative to the window main bodies correspondingly, wherein the a ranges from 0 degree to 90 degrees;
  (2) When the placement angle of the large-screen display is greater than b, the window control bars are set on the upper portions relative to the window main bodies correspondingly, wherein the b ranges from 0 degree to 90 degrees;
  (3) When the placement angle of the large-screen display is smaller than c, the window control bars are expanded correspondingly, wherein the c ranges from 0 degree to 90 degrees;
  (4) When the placement angle of the large-screen display is greater than d, the window control bars are shrunk correspondingly, wherein the d ranges from 0 degree to 90 degrees; and The four angle values of a, b, c and d may be the same or different herein.

Optionally, the device further includes:

When the touch screen operation information, the operation information of external input equipment such as a mouse, and the screen placement information all exist, the window layout mode corresponding to the touch screen operation information is preferentially adopted, that is, when the detection information includes at least the touch screen operation information, the window layout mode corresponding to the detection information is the window layout mode corresponding to the touch screen operation information; and when the detection information does not include the touch screen operation information but includes the screen placement information, the window layout mode corresponding to the detection information is the window layout mode corresponding to the screen placement information.

Optionally, the device further includes:

An updating unit configured to update the correspondence between the various kinds of detection information and the window layout positions which is stored in the window layout table.

The correspondence between the various kinds of detection information and the window layout sizes which is stored in the window layout table can also be changed or updated.

The correspondence between the various kinds of detection information and the window layout which is stored in the window layout table may be updated by the user according to user needs, or may be automatically updated by a server by analyzing user operation habits.

In this way, according to the layout device for the window control bars provided by the present disclosure, the large-screen display is connected to the intelligent terminal, and at least one window is displayed on the large-screen display. The intelligent terminal firstly receives the detection information from the large-screen display, wherein the detection information includes screen operation information or screen placement information; then, the intelligent terminal determines the window layout positions corresponding to the detection information in the preset window layout table, wherein the correspondence between various kinds of detection information and the window layout positions is stored in the window layout table; and afterwards, the intelligent terminal calls the preset window control bar layout interface to lay out the window control bars on the windows displayed on the large-screen display according to the above window layout positions. Therefore, the window control bars displayed on the screen are adaptively laid out and adjusted according to various kinds of information of the large-screen display, and the user experience is improved.

Figure 12:
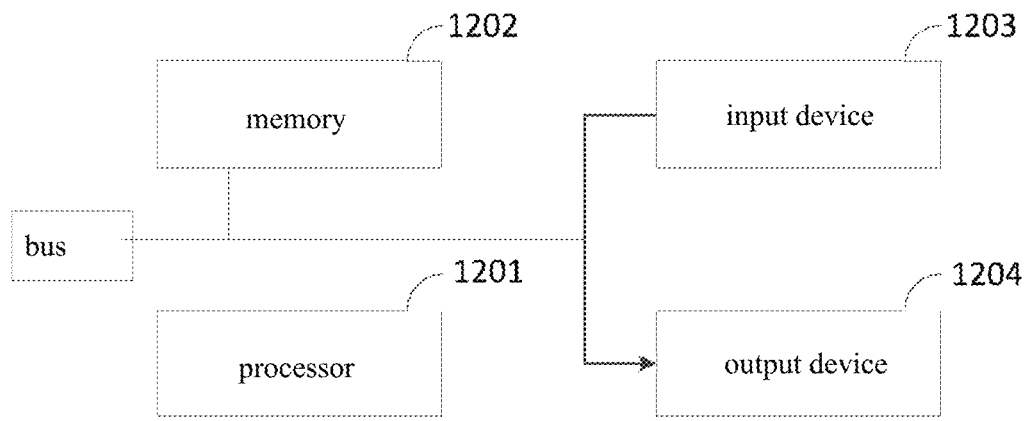
FIG. 12 is a schematic structural diagram of layout equipment for window control bars according to an embodiment of the present disclosure.

Correspondingly, an embodiment of the present disclosure also provides layout equipment for window control bars. As shown in FIG. 12, the layout equipment may include:

A processor 1201, a memory 1202, an input device 1203 and an output device 1204. The layout equipment for the window control bars may include one or more processors 1201, and one processor is taken as an example in FIG. 12. In some embodiments of the present disclosure, the processor 1201, the memory 1202, the input device 1203 and the output device 1204 may be connected through a bus or in other ways. In FIG. 12, connection through a bus is used as an example.

The memory 1202 may be configured to store software programs and modules. The processor 1201 runs the software programs and modules stored in the memory 1202 to execute various functional applications and data processing of the layout equipment for the window control bars. The memory 1202 may mainly include a program storage area and a data storage area, wherein the program storage area may store an operating system, application programs required for at least one function and the like. In addition, the memory 1202 may include a high-speed random access memory, and may also include a nonvolatile memory, such as at least one magnetic disk storage device, a flash memory device or other volatile solid-state storage devices. The input device 1203 may be configured to receive input numeric or character information, and generate signal input related to user settings and function control of the layout equipment for the window control bars.

Specifically, the processor 1201 in the embodiment loads executable files corresponding to the process of one or more application programs into the memory 1202 according to the following instructions, and the processor 1201 runs application programs stored in the memory 1202, so that various functions in the layout method for the window control bars described above are achieved.

As the device embodiments basically correspond to the method embodiments, the relevant parts can be referred to the description of the method embodiments. The device embodiments described above are only schematic, wherein the units described as separate components may or may not be physically separated, and the components displayed as units may or may not be physical units, that is, may be located at one place or may be distributed to multiple network elements. Some or all of the modules may be selected according to actual needs to achieve the purpose of the solution of the embodiment. Those of ordinary skill in the art can understand and implement the embodiment without creative labor.

It should be noted that relational terms such as first and second are only used to distinguish one entity or operation from another entity or operation herein, and do not necessarily require or imply that there is any such actual relationship or order among these entities or operations. Moreover, the terms "comprise", "include" or any other variant thereof are intended to cover non-exclusive inclusion, so that a process, method, article or equipment comprising a series of elements comprises not only those elements, but also those not explicitly listed or comprises other elements which are inherent to the process, method, article or equipment. Without more restrictions, the element defined by the sentence "comprises a . . . " does not exclude that there are other identical elements in the process, method, article or equipment that comprises the element.

The layout method, device and equipment for the window control bars according to the embodiments of the present disclosure are described in detail above. Specific examples are used in the article to explain the principles and implementation modes of the present disclosure. The descriptions of the above embodiments are only for easy understanding of the method of the present disclosure and the core ideas of the method; and meanwhile, for those of ordinary skill in the art, according to the ideas of the present disclosure, there will be changes in the specific implementation modes and scope of application. In summary, the content of the specification should not be interpreted as a limitation of the present disclosure.

The invention claimed is:

1. A layout method for window control bars, wherein the method is applied to an intelligent terminal, the intelligent terminal is connected with a large-screen display, at least one window is displayed on the large-screen display, and the method comprises:
   receiving detection information from the large-screen display by the intelligent terminal, wherein the detection information comprises information indicating a type among a plurality of types of inputting information to the large-screen display or information indicating a position of the large-screen display relative to a horizontal plane;
   determining a display position of a window control bar relative to the at least one window corresponding to the detection information based on a preset table by the intelligent terminal, wherein the preset table stores corresponding relationships between a plurality of kinds of detection information and a plurality of display positions of a window control bar relative to a corresponding window; and
   calling a preset window control bar layout interface by the intelligent terminal to lay out the window control bar on the at least one window displayed on the large-screen display based on the determined display position of the window control bar.

2. The layout method for the window control bars according to claim 1, wherein the detection information comprises screen operation information, and the screen operation information comprises touch screen operation information and/or mouse operation information;
   wherein the receiving detection information from the large-screen display by the intelligent terminal comprises:
   receiving the touch screen operation information sent by the large-screen display when a touch screen operation is detected by the large-screen display by the intelligent terminal; or
   receiving the mouse operation information sent by the large-screen display when a mouse operation is detected by the large-screen display by the intelligent terminal.

3. The layout method for the window control bars according to claim 2, wherein the preset table stores a correspondence between the touch screen operation information and preset positions of displaying window control bars on lower portions of corresponding windows, and a correspondence between the mouse operation information and preset positions of displaying window control bars on upper portions of the windows.

4. The layout method for the window control bars according to claim 1, wherein the detection information comprises screen placement information; and the screen placement information comprises placement angle information of the large-screen display;
   wherein the receiving detection information from the large-screen display by the intelligent terminal comprises:
   receiving the placement angle information, detected by a gravity sensor of the large-screen display, of the large-screen display by the intelligent terminal.

5. The layout method for the window control bars according to claim 4, wherein the preset table stores the correspondence between the horizontal placement of the large-screen display and preset positions of displaying window control bars on lower portions of corresponding windows, and/or the correspondence between the vertical placement of the large-screen display and preset positions of displaying window control bars on upper portions of corresponding windows.

6. The layout method for the window control bars according to claim 1, wherein the method further comprises the step:
   updating the stored corresponding relationships between the plurality of kinds of detection information and the plurality of display positions of a window control bar relative to a corresponding window.

7. A layout method for window control bars, wherein the method is applied to an intelligent terminal, the intelligent terminal comprises or is connected with a display device, at least one window is displayed on the display device, and the method comprises:
   receiving detection information by the intelligent terminal, wherein the detection information comprises information indicating a type among a plurality of types of inputting information to the display device or information indicating a position of the display device relative to a horizontal plane;
   receiving detection information by the intelligent terminal, wherein the detection information comprises information indicating a type among a plurality of types of inputting information to the display device or information indicating a position of the display device relative to a horizontal plane;

determining, by the intelligent terminal, a window control bar layout mode corresponding to the detection information based on a preset correspondence between the detection information and the window control bar layout modes, wherein the window control bar layout mode indicates a display position of a window control bar relative to a corresponding window; and laying out, by the intelligent terminal, the window control bar on the at least one window displayed on the display device based on the determined window layout mode corresponding to the detection information.

8. The layout method for the window control bars according to claim 7, wherein the detection information further comprises preset instruction information, and the preset instruction information comprises voice instruction information and/or motion track information and/or click operation information.

9. The layout method for the window control bars according to claim 8, wherein the motion track information comprises a motion direction, and the preset correspondence between the detection information and the window control bar layout mode comprises: a position change direction, corresponding to the motion direction, of the window control bars relative to window main bodies;

wherein, the motion direction comprises a contact sliding direction or a motion direction of a signal of external input equipment on the display device.

10. The layout method for the window control bars according to claim 7, wherein the preset correspondence between the detection information and the window control bar layout mode comprises set positions, corresponding to the detection information, of the window control bars relative to the window main bodies, and/or a scaling size, corresponding to the detection information, of the window control bars.

11. The layout method for the window control bars according to claim 10, wherein the screen operation information comprises touch screen operation information and/or external input equipment operation information.

12. The layout method for the window control bars according to claim 11, wherein the preset correspondence between the detection information and the window control bar layout mode comprises:

(1) the touch screen operation information corresponds to the mode that the window control bars are set on the lower portions relative to the window main bodies, and/or corresponds to expansion of the window control bars;

(2) the external input equipment operation information corresponds to the mode that the window control bars are set on the upper portions relative to the window main bodies, and/or corresponds to shrinkage of the window control bars; and (3) the detection information does not comprise the external input equipment operation information corresponds to the mode that the window control bars are set on the lower portions relative to the window main bodies, and/or corresponds to expansion of the window control bars.

13. The layout method for the window control bars according to claim 11, wherein when the detection information at least comprises touch screen operation information, the window control bar layout mode corresponding to the detection information is the window control bar layout mode corresponding to the touch screen operation information;

and when the detection information does not comprise touch screen operation information but comprises screen placement information, the window control bar layout mode corresponding to the detection information is the window control bar layout mode corresponding to the screen placement information.

14. The layout method for the window control bars according to claim 10, wherein the screen placement information comprises a placement angle of the display device.

15. The layout method for the window control bars according to claim 14, wherein the preset correspondence between the detection information and the window control bar layout mode comprises at least one of the following correspondences:

(1) when the placement angle of the display device is smaller than a first preset value, the window control bars are set on the lower portions relative to the window main bodies correspondingly, wherein the first preset value ranges from 0 degree to 90 degrees;

(2) when the placement angle of the display device is greater than a second preset value, the window control bars are set on the upper portions relative to the window main bodies correspondingly, wherein the second preset value ranges from 0 degree to 90 degrees;

(3) when the placement angle of the display device is smaller than a third preset value, the window control bars are expanded correspondingly, wherein the third preset value ranges from 0 degree to 90 degrees; and (4) when the placement angle of the display device is greater than a fourth preset value, the window control bars are shrunk correspondingly, wherein the fourth preset value ranges from 0 degree to 90 degrees.

16. The layout method for the window control bars according to claim 7, wherein the method further comprises the step:

updating the preset correspondence between the detection information and the window control bar layout mode.

17. A layout equipment for window control bars, wherein the equipment comprises a memory and a processor, wherein the memory is configured to store program codes and transmit the program codes to the processor; and the processor is configured to execute operations according to instructions in the program codes, the operations are applied to an intelligent terminal, the intelligent terminal comprises or is connected with a display device, at least one window is displayed on the display device, and the operations comprise:

receiving detection information by the intelligent terminal, wherein the detection information comprises information indicating a type among a plurality of types of inputting information to the display device or information indicating a position of the display device relative to a horizontal plane;

determining, by the intelligent terminal, a window control bar layout mode corresponding to the detection information based on a preset correspondence between the detection information and the window control bar layout modes, wherein the window control bar layout mode indicates a display position of a window control bar relative to a corresponding window; and laying out, by the intelligent terminal, the window control bar on the at least one window displayed on the display device based on the determined window layout mode corresponding to the detection information.

18. The layout equipment for window control bars according to claim 17, wherein the display device is a large-screen display device, and at least one window is displayed on the large-screen display device, and the operations further comprise:
    receiving the detection information from the large-screen display by the intelligent terminal;
    determining the display position of the window control bar corresponding to the detection information based on a preset table by the intelligent terminal, wherein the preset table stores corresponding relationships between a plurality of kinds of detection information and a plurality of display positions of a window control bar relative to a corresponding window; and
    calling a preset window control bar layout interface by the intelligent terminal to lay out the window control bar on the window displayed on the large-screen display based on the determined display position of the window control bar.

19. The layout equipment for window control bars according to claim 17, wherein the detection information further comprises preset instruction information, and the preset instruction information comprises voice instruction information and/or motion track information and/or click operation information.

20. The layout equipment for window control bars according to claim 17, wherein the preset correspondence between the detection information and the window control bar layout mode comprises set positions, corresponding to the detection information, of the window control bars relative to the window main bodies, and/or a scaling size, corresponding to the detection information, of the window control bars.

\* \* \* \* \*